United States Patent [19]

Bacon et al.

[11] 4,166,690

[45] Sep. 4, 1979

[54] DIGITALLY REGULATED POWER SUPPLY FOR USE IN ELECTROSTATIC TRANSFER REPRODUCTION APPARATUS

[75] Inventors: James L. Bacon; Larry M. Ernst; William G. Hauptman, all of Boulder, Colo.

[73] Assignee: International Business Machines Corporation, Armonk, N.Y.

[21] Appl. No.: 847,957

[22] Filed: Nov. 2, 1977

[51] Int. Cl.[2] .................... G03G 15/02; H02M 3/335

[52] U.S. Cl. .................... 355/3 CH; 307/41; 323/23; 363/26

[58] Field of Search .................... 250/325, 326; 307/18, 307/24, 38, 41, 80–82; 323/225 C, 225 T, 23, 25, DIG. 1; 355/3 CH, 14; 361/235; 363/26

[56] References Cited

U.S. PATENT DOCUMENTS

| | | | |
|---|---|---|---|
| 3,819,942 | 6/1974 | Hastwell et al. | 361/235 X |
| 3,934,141 | 1/1976 | Vargas | 250/325 |
| 3,961,193 | 6/1976 | Hudson | 361/235 X |
| 4,017,744 | 4/1977 | Johnson | 323/22 SC |
| 4,074,134 | 2/1978 | Roalson | 250/325 X |

OTHER PUBLICATIONS

DeBrita et al., "Integrated Binary Power Controller", IBMTDB, vol. 17, No. 8, Jan. 1975, pp. 2227–2229.

Ernst, "Dark Voltage Control System", IBMTDB, vol. 17, No. 5, Oct. 1974, p. 1408.

Calvo et al., "Analog-Digital Transistor Switching Regulator Controller", IBMTDB, vol. 17, No. 9, Feb. 1975, pp. 2666/7.

*Primary Examiner*—A. D. Pellinen

*Attorney, Agent, or Firm*—Wesley DeBruin

[57] ABSTRACT

A digitally regulated power supply for the corona charging unit of an electrostatic copying machine in which a sample of the ionic current of the corona unit is utilized in conjunction with a digital regulator to regulate the power supply establishing the charge of the corona. The digital regulator in conjunction with at least one pulse width modulated power supply permits very fast rise and fall times of the power supply current. Further, between duty cycles of the machine, the digital regulator stores a representation of the correct operating point of the corona charging unit determined in the immediately prior duty cycle. In the next duty cycle, the representation is utilized by the digital regulator to initially regulate the power supply.

13 Claims, 14 Drawing Figures

POWER SUPPLY

PRIOR ART

FIG. 1 (FIG. 1 OF U.S. PATENT NOS. 3,736,055 AND R.E. 29,179)

POWER SUPPLY

DIGITAL REGULATOR

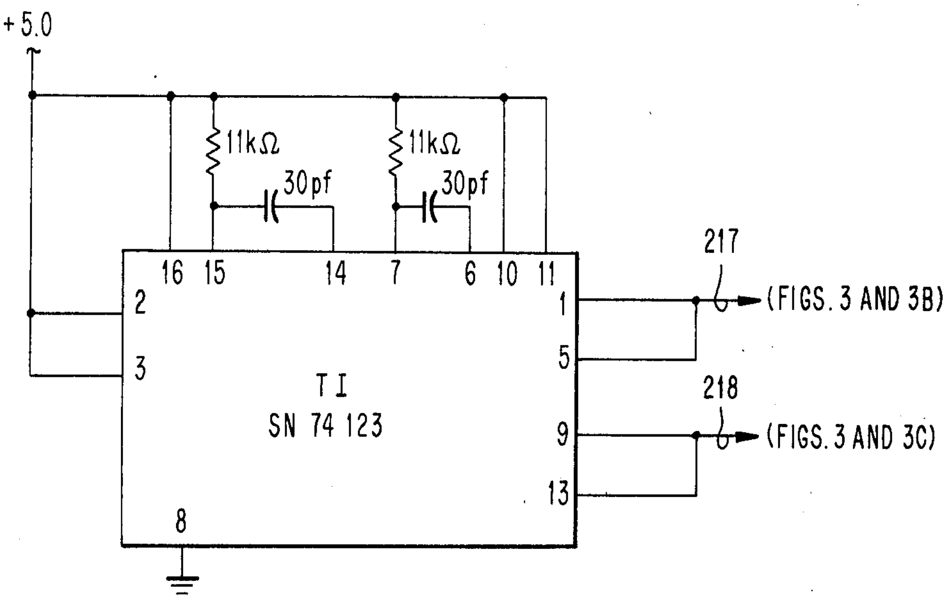
FIG. 3A 5.12 MHZ OSCILLATOR
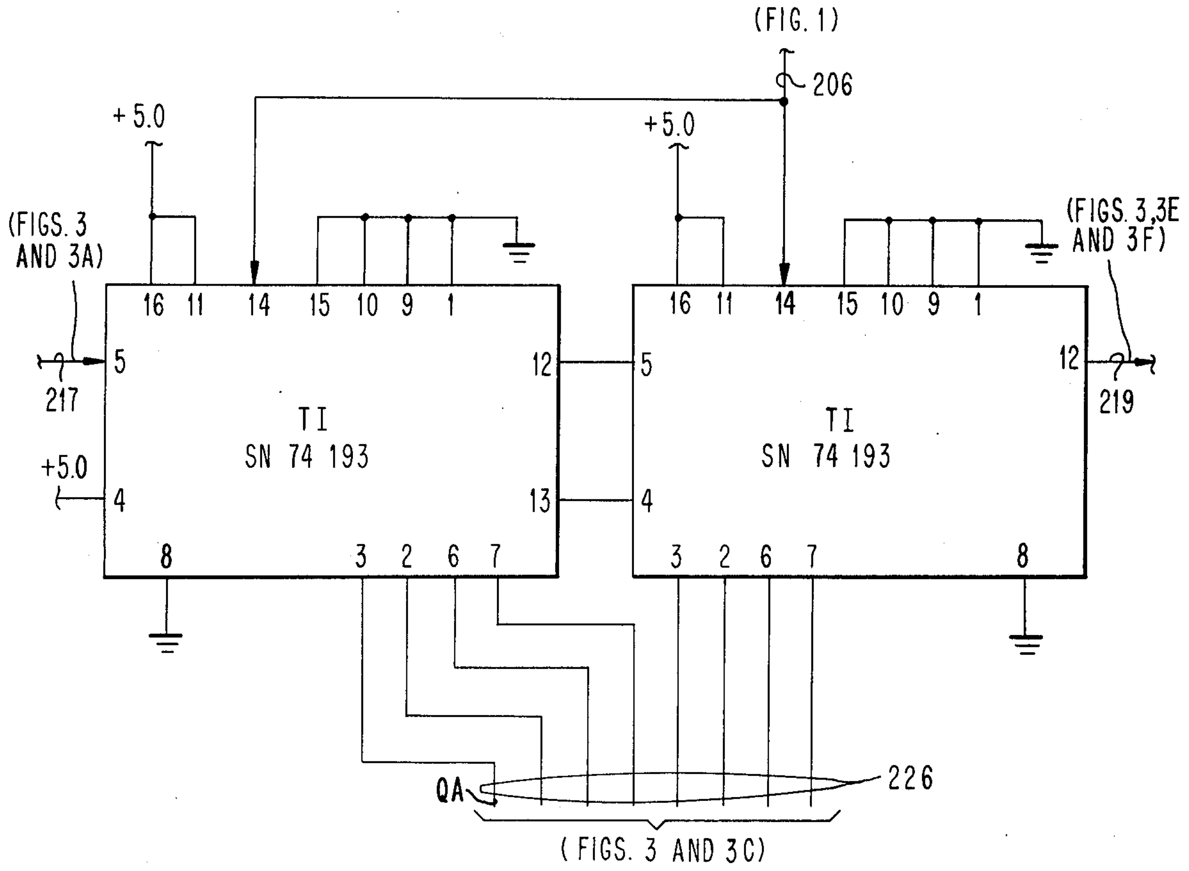
FIG. 3B (NOTE QA LEAST-SIGNIFICANT BIT)
8 BIT COUNTER

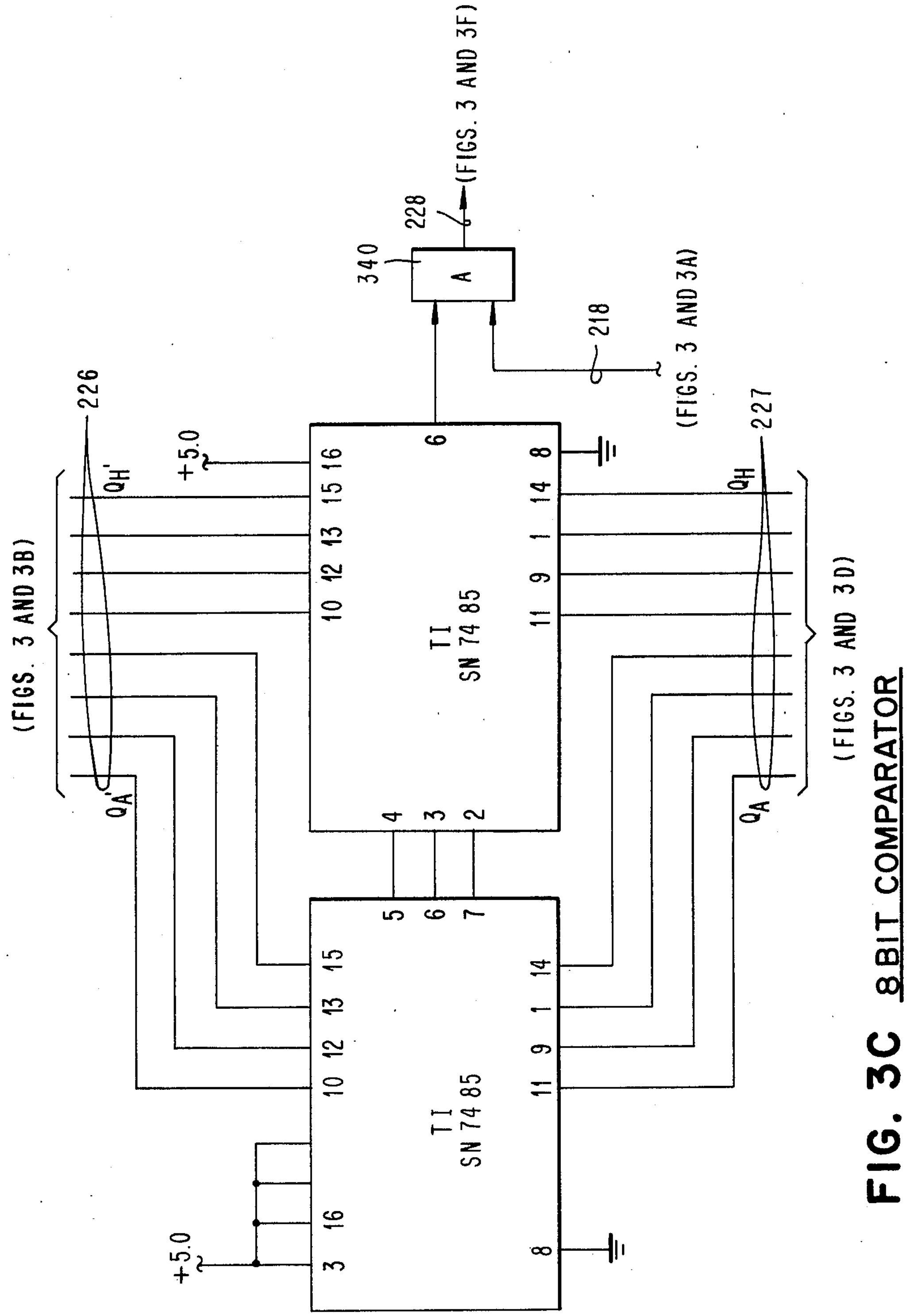
FIG. 3C 8 BIT COMPARATOR

8 BIT UP / DOWN COUNTER

5 BIT COUNTER AND T FLIP-FLOP

R-S FLIP-FLOP

THRESHOLD DETECTOR

LOW PASS FILTER

PULSE WIDTH MODULATED POWER SUPPLY NO. 1

PULSE WIDTH MODULATED POWER SUPPLY NO. 2

TIMING CHART

DIGITALLY REGULATED POWER SUPPLY FOR USE IN ELECTROSTATIC TRANSFER REPRODUCTION APPARATUS

BACKGROUND OF THE INVENTION AND PRIOR ART

1. Field of the Invention

The invention relates to an electrostatic transfer reproduction apparatus and more particularly, to a digitally regulated power supply for the corona charging unit.

As is well known in the prior art, in an electrostatic copying system a photoconductive surface first is moved past a corona discharge unit which is intended to apply a uniform electrostatic charge to the surface. After leaving the corona unit, the surface moves past an exposure system at which it is exposed to a light image of the original to cause the charge to leak off in exposed areas and to be retained in relatively dark areas of the original. Following the exposure step, the latent electrostatic image is developed by the application of toner particles thereto. In some systems of the art, the image may be formed on a sheet of photoconductive material and in other systems the image may be formed on another photoconductive surface such as that of a drum or a belt and be transferred to a sheet of plain paper or the like following development.

It will readily be appreciated that copy produced in an electrostatic copying system is a function of the charge applied to the photoconductive surface (photoconductor) by the corona. Not only should the charge be uniform over the image portion of the photoconductive surface, but also it should not vary from copy to copy of the original. Certain of the corona systems of the prior art use as a power source a 240 volt alternating current extra high tension transformer and rectifier system to provide the relatively high direct current potential required to operate the corona. Corona supply systems of this type have a number of shortcomings. Fluctuations in the supply voltage result in wide variations of the corona or ionic current which, in turn, result in variations in the charge applied to the photoconductive surface on successive operations thereof. Variations in the charge level of the photoconductor surface from a uniform optimum norm directly translates into non-uniform and/or poor quality copies. In addition, the systems of the prior art have slow response times (on and off times) and are heavy, expensive and bulky.

The terms, Xerography, Photoconductive, Photoconductive Insulator, Photoconductive Insulating Plate, Corona Discharge, Corona Discharge Unit, and Electrostatic Charge, are defined as follows:

XEROGRAPHY is an imaging process in which a photoconductive insulating plate is uniformly charged (sensitized) in the dark and subsequently exposed to a light image of the object to be copied to form an electrostatic image on the plate. The electrostatic image is made visible (i.e. developed) by the application of electroscopic powder particles which are attracted to the image. In transfer xerography these particles are then transferred from the plate to a transfer material (e.g., paper) by applying an electrostatic charge to the transfer material. The powder image is subsequently fused to the transfer material. The term "electrophotography" is synonymous with xerography.

PHOTOCONDUCTIVE - The property of a material whereby an increase in electrical conductivity is caused in response to light.

PHOTOCONDUCTIVE INSULATOR - A material which is, in the dark, electrically insulating but which, on exposure to light, becomes electrically conductive in those areas exposed.

PHOTOCONDUCTIVE INSULATING PLATE - The plate used in a xerographic process on which the electrostatic charge image is formed. The plate may be flat, curved, the surface of a drum, a scroll, or take any other form. The terms xerographic plate, image bearing plate, image bearing member, image plate, photoconductor (pc), organic photoconductor (opc), photoreceptor, xerographic drum, drum, insulating layer and photoconductive printing surface as used in xerography all indicate the photoconductive insulating plate.

ELECTROSTATIC IMAGE - A charge pattern on the photo-conductive insulating plate conforming to the illuminated object being copied. The terms "latent image" and "latent electrostatic image" as used in Xerography are synonymous with electrostatic image.

CORONA DISCHARGE - The effect produced by applying a high voltage to a fine wire or point which causes the air in the immediate vicinity of the wire or points to ionize. The ions thus produced will flow to a conductor of lower voltage. In modern Xerographic equipment a Corona discharge is employed to charge the photoconductive insulating plate, to effect transfer of the developed image from the photoconductive insulating plate to the transfer material and for other purposes.

CORONA DISCHARGE UNIT - A structure, also termed in the art a Corotron, wherein the corona discharge takes place. Numerous such structures, employing a plurality of generally parallel corona wires oriented generally perpendicularly to the direction of scanning movement of a photoconductive surface relative to the charging system in an electrophotographic copier, or the like, are known to the art.

ELECTROSTATIC CHARGE - As used in Xerography, the charge of static electricity applied to a photoconductive insulating plate or to the transfer material. An electrostatic charge is an electrical charge. When applied to the transfer sheet the electrostatic charge effects transfer and also causes the transfer material to adhere electrostatically to the surface of the photoconductive insulating plate.

Reference is made to U.S. Pat. No. 2,548,452, entitled "Corona Triode Voltage Regulator", granted Apr. 10, 1951 to C. M. Turner.

Reference is made to U.S. Pat. No. 3,062,956 entitled "Xerographic Charging Apparatus", granted Nov. 6, 1962 to J. J. Codichini.

Reference is made to U.S. Pat. No. 3,122,634 entitled "Controlled Charging in Xerographic Copying Apparatus" granted Feb. 25, 1964 to Paul F. King.

Reference is made to U.S. Pat. No. 3,489,895 entitled "Regulated Electrostatic Charging Apparatus" granted Jan. 13, 1970 to H. J. Hollberg.

Reference is made to U.S. Pat. No. 3,604,925 entitled "Apparatus for Controlling the Amount of Charge Applied to a Surface" granted Sept. 14, 1971 to C. Snelling.

Reference is made to U.S. Pat. No. 3,699,335 entitled "Apparatus for Charging a Recording Element with An Electrostatic Charge of a Desired Amplitude" granted Oct. 17, 1972 to E. C. Giaimo, Jr.

Reference is made to U.S. Pat. No. 3,770,927 entitled "Corona Charger Configuration" granted Nov. 6, 1973 to P. J. Hastwell.

Reference is made to U.S. Pat. No. 3,805,739 entitled "Controlling Multiple Voltage Levels for Electrostatic Printing" granted Apr. 23, 1974 to R. F. Feldeisen, et al.

Reference is made to U.S. Pat. No. 3,819,942 entitled "Regulated Power Supply for Corona Charging Unit" granted June 25, 1974 to P. J. Hastwell, et al.

Reference is made to the publication "Dark Voltage Control System" by L. M. Ernst, IBM Technical Disclosure Bulletin, Vol. 17, No. 5, Oct. 1974, pg. 1408.

Reference is made to U.S. Pat. No. 3,586,908 entitled "Automatic Potential Control System for Electrophotography Apparatus" granted June 22, 1971 to R. E. Vosteen.

Reference is made to U.S. Pat. No. 3,335,274 entitled "Xerographic Charging Apparatus with Means to Automatically Control the Potential Applied to the Corona Wire" granted Aug. 8, 1967 to J. J. Codichini, et al.

Reference is made to U.S. Pat. No. 2,965,756 entitled "Electrostatic Charging Apparatus" granted Dec. 20, 1960 to R. G. Vyverberg.

It is usual to charge the xerographic plate by means of a corona generating device which when supplied with potential above the corona threshold produces an emission of corona ions. Representative embodiments of corona generating devices are disclosed in Walkup U.S. Pat. No. 2,777,957 and in Vyverberg U.S. Pat. No. 2,836,725.

Reference is made to U.S. Pat. No. 3,076,092 entitled "Xerographic Charging Apparatus" granted Jan. 29, 1963 to G. R. Mott.

Reference is made to U.S. Pat. No. 3,578,970 entitled "Variable Width Corona Discharge Apparatus With Means to Shield or Vary a Predetermined Length of a Corona Discharge Wire" granted May 18, 1971 to D. F. Michaud.

SUMMARY OF THE INVENTION

A primary object of the invention is to provide an improved electrophotographic copier.

A further primary object of the invention is to provide an improved power supply for corona charging apparatus particularly (though not limited to) suited for employment in an electrophotographic copier.

A yet further primary object of the invention is to provide a digitally controlled power supply to provide power to a charging corona in an electrophotographic copier.

In accordance with the invention a digitally controlled power supply provides power to a charging corona unit in an electrophotographic copier. The power supply is supplied by a pulse width modulated square wave. The duty cycle of the pulse width is controlled by a digital regulator. The regulator monitors the power applied to the corona unit and sets a digital count. The digital count is compared with a cyclic count to accomplish the duty cycle modulation of the power supply.

A primary feature of the invention includes preconditioning of the comparison during warm-up of the corona unit whereby during operative runs the corona may be rapidly brought to the desired voltage level by the preconditioned count loaded into the digital regulator.

A further feature of the invention is that the corona may be segmented and sequentially switched by segment when the power supply is at preconditioned regulated level. Also, when all segments of the segmented corona unit are powered the feedback loop in the power supply regulator is in operation to dynamically regulate voltages applied to the corona.

In accordance with the invention a method is provided and disclosed for rapidly supplying a predetermined voltage from a power supply to a charge corona unit. The method includes the following steps: (a) preconditioning a digital regulator of the corona unit power supply to provide a nominal operating level for the corona voltage supplied to the corona unit; (b) digitally controlling the power supply, with the preconditioned digital regulator upon electrical connection of the power supply to the corona unit; and (c) utilize the digital regulator to digitally dynamically regulate the power supply in accordance with variations of voltage on the corona after the power supply is electrically connected to the corona unit. The afore-recited method, in accordance with the invention, is further characterized as follows: (1) sequentially switching power supply electrical connections to segments of a segmented corona unit; (2) utilizing the digital regulator to regulate the power supply with the preconditioned nominal operating point for the corona when selected segments of the corona unit are active, and (3) digitally dynamically regulating the power supply when all segments of the corona unit are electrically connected to the power supply.

The foregoing and other objects, features and advantages of the invention will be apparent from the following more particular description of the preferred embodiment of the invention as illustrated in the accompanying drawings.

BRIEF DESCRIPTION OF THE DRAWING

In the drawings:

FIG. 3A, in accordance with the preferred embodiment of the invention, discloses a circuit schematic of circuitry interconnecting a block, representing a commercially available component, to provide the 5.12 megahertz oscillator employed in the digital regulator of FIG. 3.

FIG. 3B, in accordance with the preferred embodiment of the invention, discloses a circuit schematic of circuitry interconnecting first and second blocks, respectively representing like commercially available components, to provide the 8-bit counter employed in the digital regulator of FIG. 3.

FIG. 3C, in accordance with the preferred embodiment of the invention, discloses a circuit schematic of circuitry interconnecting first and second blocks, respectively representing like commercially available components, to provide the 8-bit comparator employed in the digital regulator of FIG. 3.

Referring now to FIG. 1 of the drawings, a continuously operating electrostatic transfer reproduction apparatus incorporating a cyclic control unit is depicted. FIG. 1 hereof corresponds identically to FIG. 1 of U.S. Pat. No. Re. 29,179 entitled "Reproduction Apparatus Incorporating Alternate Redevelopment and Reimaging Cycles for Multiple Copies" granted Apr. 12, 1977 to R. W. Davidge, et al and of common assignee with this application. U.S. Pat. No. Re. 29,179 is a reissue of U.S. Pat. No. 3,736,055 granted May 29, 1973 on application Ser. No. 209,326 filed December 1971. The disclosure of U.S. Pat. No. Re. 29,179 is incorporated herein by reference thereto to the same extent as though it was set forth herein word for word. The apparatus disclosed in U.S. Pat. No. Re. 29,179 is incorporated by reference as a convenience in providing a full and complete description and understanding of reproduction apparatus in which the employment of applicants' digitally regulated power supply is advantageously employed. As will be readily apparent from the detailed description and explanation of applicants' invention, the utility and advantages of applicants' invention is not limited to the apparatus disclosed in U.S. Pat. No. Re. 29,179. Applicants' invention has particular utility in apparatus requiring a highly responsive regulated power supply and in particular, apparatus utilizing a corona discharge.

Referring to FIG. 1, the reproduction apparatus comprises a plurality of processing stations located about a cylindrically shaped photosensitive electrostatic plate 11. The cylindrical plate comprises a layer of photoconductive material superimposed over a conductive backing. A suitable photoconductive material is disclosed in U.S. Pat. No. 3,484,237 issued Dec. 16, 1969. The cylindrical plate is divided into three segments or frames designated A, B and C. The frames are separated from one another by interframe or intersegment gaps, a, b and c.

Figure 1:
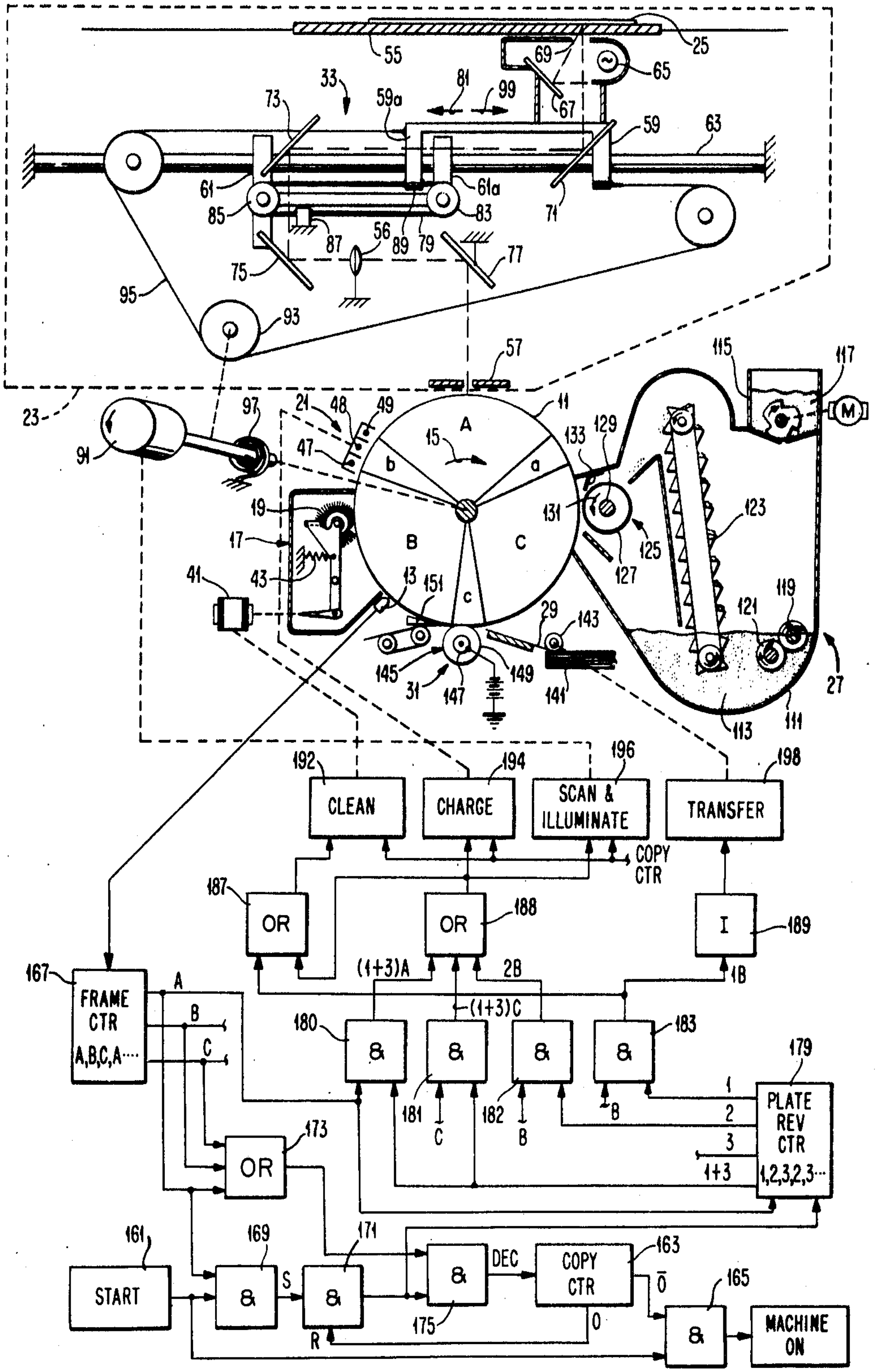
FIG. 1 (which corresponds identically with FIG. 1 of U.S. Pat. No. 3,736,055 and No. Re. 29,179) is a schematic diagram of a continuously operating electrostatic transfer reproduction apparatus incorporating a cyclic control unit for automatically effecting alternate redevelopment and re-imaging cycles.

A sensing device 13 senses permanently recorded signals within the interframe gap portion of the electrostatic plate and supplies logical signals to a cyclic control apparatus indicating the positional relationship of the various frames with respect to the various processing stations, as the electrostatic plates rotates in the direction of arrow 15 past the processing stations. The electrostatic plate 11 first passes a cleaning station 17 having an actuable cleaning member 19 located therein. When actuated, the cleaning member 19 brushes the surfaces of the electrostatic plate 11 removing any foreign material including developer material therefrom. The plate then passes an actuable charging station consisting of a corona generating device 21 which sensitizes the electrostatic plate 11 as it rotates therepast. Thereafter, the electrostatic plate passes an imaging station 23 which, when actuated, projects a light image of a master 25 onto a frame segment of the electrostatic plate 11 rotating thereunder. The projection of the light image onto the sensitized electrostatic plate creates a latent electrostatic image thereon which rotates with the plate as it passes the developer station 27. At the developer station 27, multicomponent developer material including an electrostatically charged toner is applied to the surface of the electrostatic plate containing the electrostatic image thereon. The charged toner particles are preferentially attracted to the latent image on the plate 11 and are subsequently transferred to a substrate surface 29 at the transfer station 31.

Still referring to FIG. 1, the actuable charging station 21 comprises three corona generating wires 47, 48 and 49 which are sequentially turned on and off as the interframe gaps of the electrostatic plate 11 rotate therepast. For example, when the actuable charging station is turning on, the corona generating wire 47 is first energized as the first portion of an interframe gap rotates therepast. The corona generating wire 48 is then turned on as the same leading edge portion of the interframe gap rotates therepast, and thereafter, the corona generating wire 49 turns on as the leading edge portion of the interframe gap rotates therepast. Thus, any discontinuities in charge levels effected by turning on the corona generating wires appear within the interframe gap portions of the electrostatic plates 11. The same magnetic signal which is sensed by the sensing device 13 may also be utilized to actuate switches to effect the sequential turn on and turn off of the corona generating wires 47, 48 and 49. The turn off sequence of the actuable charging station is identical to the turn on sequence.

DESCRIPTION OF THE PREFERRED EMBODIMENT OF THE INVENTION

In the design of high speed electrophotographic copiers, or the like, it is necessary to switch the different corona wires in the corona generating device of the machine "on" and "off" very rapidly. For example, in the range of 5 to 10 milliseconds or less.

It has been determined from working with coronas that the optimum operating point (energy provided at high voltage to the corona generating unit) is relatively independent of time and depends primarily on factors such as altitude, temperature, humidity, etc., which vary at a relatively very slow rate with time. In the design of power supplies the following has been found: (1) voltage across one single component (state of a counter or register in a digital system) controls the output of the power supply; and (2) the rise and fall time of the power supply in an open loop manner is very much faster than in a closed loop. In fact, the rise and fall time of a supply open loop is generally two or three cycles of the operating frequency of the transformer. Thus, if a power supply is pre-conditioned by knowing the correct (optimum) operating point ahead of time and then allow the power supply to turn on or off open loop until the optimum operating point is reached, it would be possible to switch the corona via the power supply directly without the use of high voltage relays, or the like, which are relatively unreliable components as compared to solid state devices.

Figure 2:
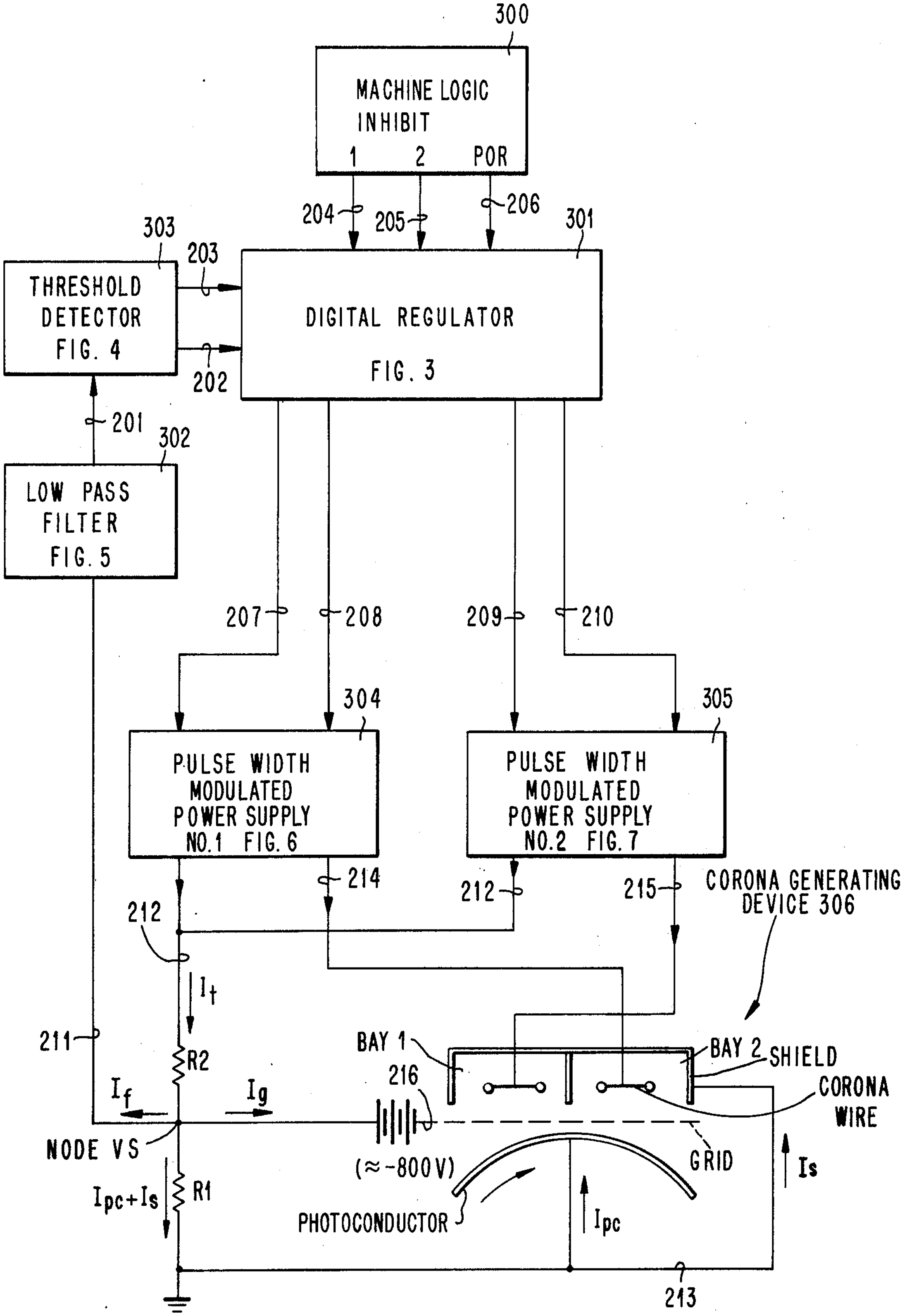
FIG. 2, in accordance with the preferred embodiment of the invention, discloses a block diagram and schematic of a digitally regulated power supply connected to a corona discharge unit of an electrophotographic machine.

FIG. 2, in accordance with the invention shows one such circuit using digital logic as the control circuit for the power supply driving the corona in electrophotographic apparatus. With the exception of the block labelled "Digital Regulator", the circuitry respectively represented by the remaining individual blocks in FIG. 2, such as "Low-Pass Filter", "Threshold Detector", etc. is essentially conventional.

Figure 3:
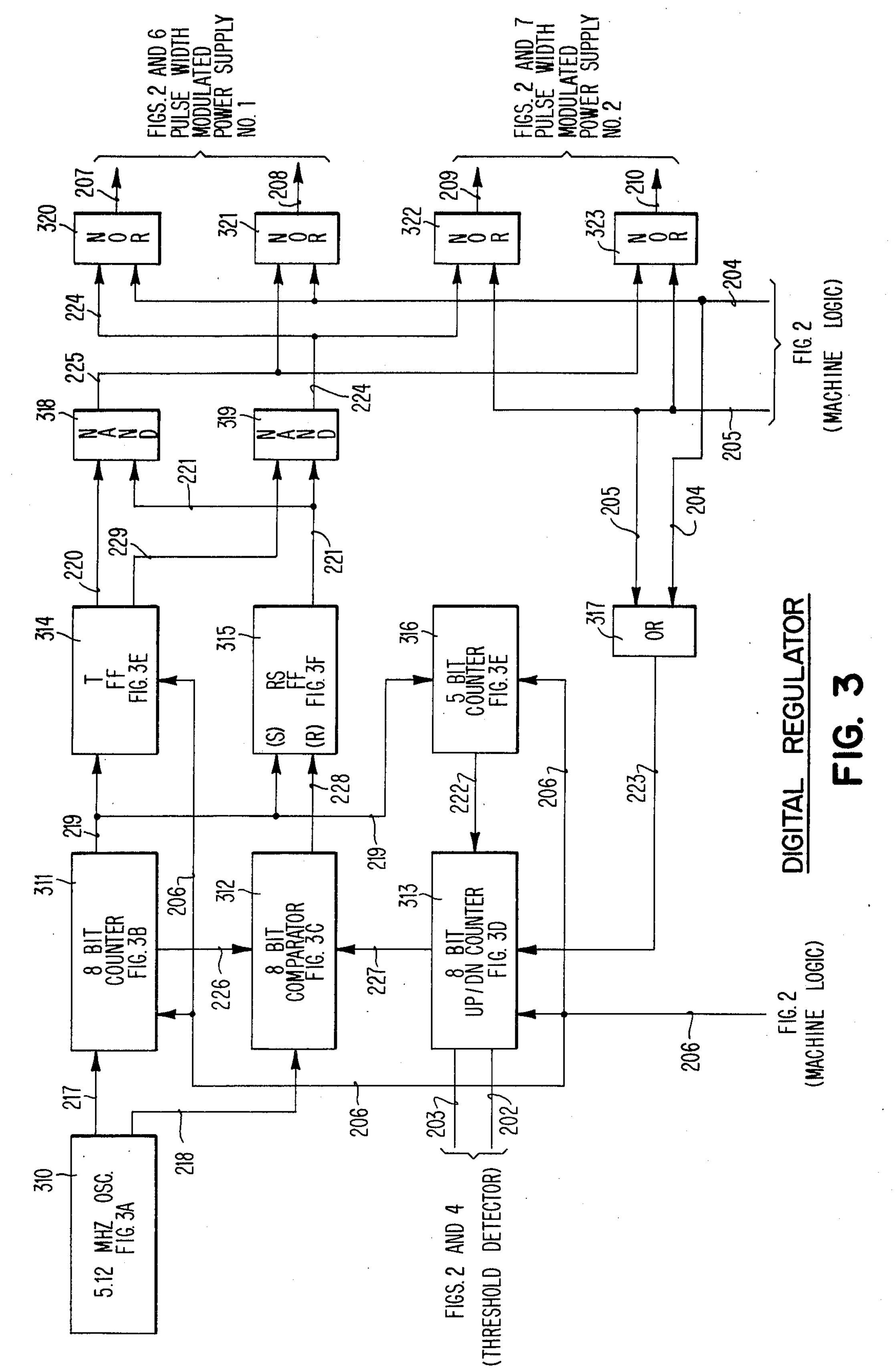
FIG. 3, in accordance with the preferred embodiment of the invention, discloses a block diagram of the digital regulator employed in the digitally regulated power supply of FIG. 2.

Referring to FIG. 3, which discloses a block diagram of the digital regulator, the circuitry respectively represented by the individual blocks is essentially conventional. The interconnection and operation of the individual circuit blocks represented in FIG. 2 is in accordance with the invention and not in accordance with the prior art. Also the Digital Regulator, FIG. 3, namely the interconnection and operation of the individual blocks is in accordance with the invention and is not in accordance with the prior art.

Referring to the IBM Technical Disclosure Bulletin Publication entitled "Dark Voltage Control System" by L. M. Ernst (Vol. 17, No. 5, October 1974, pg. 1408) the system of FIG. 2 connects the power supply to the corona generating device in a manner similar to that disclosed in the publication. The system disclosed in the publication operates by holding a constant ratio between currents $I_g$ (grid current) and $I_{pc}$ (photoconductor current), while the grid voltage is maintained fixed to hold a constant dark on the photoconductor. As will be more apparent from the detailed description, the system of FIG. 2 upon arriving at an optimum operating condition of the corona generating device maintains the ratio of $I_g$ to $I_{pc}$ essentially constant.

In many electrophotographic machines, particularly the higher speed more technically sophisticated machines, there is a requirement in addition to fast corona switching. The requirement, or condition, is that the interimage area where corona switching takes place is narrower than the width of the corona. To meet this condition or obviate this problem, the corona generating device has been divided into multi-bays (for purposes of this discussion two bays), each bay being narrower than the leading and trailing interimage area so each bay may be switched by an independent high frequency power supply.

The following broad description of the operation of the invention will be more fully understood and apparent to persons skilled in the art in view of the detailed description and explanation of the operation of the invention set forth hereinafter. When the electrophotographic machine is first turned on, the machine POR (FIG. 2, lead 206, power-on-reset) will set the 8-bit UP/DOWN counter of the digital regulator (FIG. 2) to a count of 255 (11111111) representing minimum power supply output or duty cycle. While the machine is in warm up, Inhibit 1 and Inhibit 2 (leads 204, 205 (FIGS. 2 and 3) will go DOWN and the charge corona power supply (Nos. 1 and 2, FIG. 2) will be electrically connected to the Corona Generating Device and the digitally regulated power supply system of the invention, will automatically seek the correct (optimum) operating point for the corona. After the correct operating point is determined, Inhibit 1 and Inhibit 2 will go UP electrically disconnecting the power supply (Nos. 1 and 2) from the Corona Generating Device. At this time, the charge operating point is represented by and stored as a count in the 8-bit UP/DOWN counter. (Merely by way of illustrative example, the count stored may be 192, or 00000011).

When the electrophotographic machine is called upon to produce a copy the digitally regulated power supply system of the invention will go through the following sequence:

(1) When the leading charge corona bay of the corona generating device is over the interimage area of the moving (usually revolving at constant speed) photoconductor medium, Inhibit 1 assumes a DOWN condition and turns on the leading bay (corona generating wire or the like) of the corona generating device.

(2) Correspondingly, when the trailing charge corona bay is over the interimage area of the moving photoconductor medium Inhibit 2 assumes a DOWN condition and turns on the trailing bay of the corona generating device.

(3) Thus, after a short time interval both bays of the corona generating device are on, the power supply closes the feedback loop and allows the 8-bit UP/-DOWN counter to be updated (not count, count UP, or count DOWN as required) to a more correct or optimum operating point for the corona generating device. Namely, the pulse width of the pulses provided to the Pulse Width Modulated Power Supplies 1 and 2 is maintained constant, decreased or increased to arrive at an optimum corona operating condition.

(4) When the leading bay of the corona generating device is over the next interimage area (following the intervening image area) Inhibit 1 assumes an UP condition and its associated bay of the corona generating device is turned off.

(5) When the trailing bay of the corona generating device is over the next interimage area Inhibit 2 assumes an UP condition and its associated bay of the corona generating device is turned off. [If either or both bays of the corona generating device are off, the 8-bit UP/-DOWN counter is inhibited from counting Up or Down. The count in the 8-bit UP/DOWN counter remains static, or the same, when one or both bays are off. Thus, the corona operating point is not changed or updated when one or both bays are off].

(6) Both bays of the corona generating device or structure are now off and awaiting machine instructions to charge an image area of the photoconductor medium. When instructed the cycle, beginning with step one supra, is repeated.

It will be appreciated that should the power supplied to the electrophotographic machine be interrupted for any reason the machine will necessarily initiate a warm cycle, as described earlier herein, to ensure that the 8-bit UP/DOWN counter has the correct operating point for the charge corona.

It is apparent from the above description that very fast rise and fall times of the power supply is a significant advantage of the invention. Further, the ability to switch coronas on and off in a narrower area of the moving photoconductor medium than the width of the corona is a significant feature of the invention. This feature yields the benefit and advantage of permitting the interimage areas to require a minimum of photoconductor area.

Referring to FIG. 2, the block bearing reference numeral 300 and labelled "Machine Logic" provides the Inhibit 1 signal, the Inhibit 2 signal and the POR signal via leads 204, 205 and 206, respectively, to Digital Regulator 301. The machine logic represented by block 300 is not expressly shown herein and per se forms no part of the subject invention. The machine logic represented by block 300 is well within the skill of persons skilled in the art to provide, and as such no detailed explanation and discussion thereof is deemed necessary for complete understanding of and the practice of applicants' invention. For example, the machine logic may be generally of the type disclosed in U.S. Pat. No. Re. 29,179 discussed earlier herein.

The Digital Regulator represented by the block bearing reference character 301 in FIG. 2 is connected via leads 207 and 208 to Pulse Width Modulated Power Supply No. 1 (reference character 304), and via leads 209 and 210 to Pulse Width Modulated Supply No. 2 (reference character 305). Each of the power supplies 304, 305 has a pair of output leads 212, 214 and 212, 215, respectively. Lead 214 connects supply 304 to the corona wire of bay 2 of corona generating device 306. Lead 215 connects supply 305 to the corona wire of bay 1 of corona generating device 306. Leads 212 of supplies 304 and 305 are connected in common via resistor R2 to Node VS. Resistor R1 is connected between Node VS and ground. The shield of corona generating device 306 is connected to ground via lead 213. Also, as is conventional in the art, and as depicted in FIG. 2, the conductive backing or support (such as the metal drum surface supporting the photoconductor) of the photoconductor is connected to ground potential. The D.C. potential source, represented as a battery in FIG. 2, and having a magnitude preferably in the order of 800 volts has its negative terminal connected to the grid of corona generating device 306 and its positive terminal connected to Node VS. Node VS is also connected via lead 211 to the Low Pass Filter represented by the block bearing reference character 302. Filter 302 has its output connected via lead 201 to the Threshold Detector represented by block 303 in FIG. 2. The output of Detector 303 is conveyed via leads 202 and 203 to digital regulator 301.

Referring to FIG. 2 when the electrophotographic copier is first turned on the machine POR will set a specified initial count in UP/DOWN digital counting means within the digital regulator. The inhibit controls will be appropriately conditioned and the digital regulator will activate and control Pulse width Modulated Power Supplies No. 1 and No. 2. Namely, the digital regulator will provide pulses of a specified width or time duration to power supplies 1 and 2. Power supply No. 1 will, via lead 214, provide electrical energy at a relatively high voltage to the corona wire of bay 2 of the corona generating device 306. Power supply No. 2 will, via lead 215, provide electrical energy at a relatively high voltage to the corona wire of bay 1 of the corona generating device 306. A corona discharge or condition will be generated and the photoconductor will assume an electrical charge. A grid current $I_g$ will flow from Node VS through the D.C. voltage source, represented by a battery, to the grid structure physically positioned between the corona generating device 306 and the photoconductor. The voltage at node VS under these conditions bears a substantially invariant mathematical relationship to the grid current $I_g$ which is indicative of the optimum operating point of the corona. The above statements admittedly are general in nature and based on design parameters of the structure and the circuitry depicted in FIG. 2. Stated differently, where $I_g$ is the grid current, $I_{pc}$ is the photoconductor current, and $I_s$ is the shield current, a proper and optimum electrical charge is placed on the photoconductor when the ratio of the photoconductor current ($I_{pc}$) to the grid current ($I_g$) is maintained essentially equal to a constant which is a function of design parameters. The voltage at Node VS is utilized as a control signal. (More precisely, a feedback current $I_f$ in lead 211 is filtered by the low pass filter). The voltage acting through the circuitry of the low pass filter 302 and threshold detector 303 provides signals on leads 202 and 203 which tell the digital regulator to increase, maintain, or decrease the electrical energy provided by power supplies 1 and 2 to the corona.

More specifically, the signals on leads 202 and 203 tell the UP/DOWN digital counting means of the digital regulator to: (1) count up from the initial count; (2) maintain the initial count; or (3) count down from the initial count. Through control exercised by additional digital circuitry contained in the digital regulator the following occurs: (1) when the UP/DOWN counting means counts up the duty cycle of power supplies 1 and 2 is increased; (2) when the UP/DOWN counting means maintains its count the duty cycle of power supplies 1 and 2 is maintained constant; and (3) when the UP/DOWN counting means counts DOWN the duty cycle of power supplies 1 and 2 is decreased.

Referring again to the voltage at node VS, it is to be appreciated that: (1) when the voltage at said node is within a predetermined range the digital regulator will control the power supplies to maintain constant their duty cycles; (2) when the voltage at said node is above said range the digital regulator will control the power supplies to increase their duty cycles; and (3) when the voltage at said node is below said range the digital regulator will control the power supplies to decrease their duty cycles.

It will be appreciated that the digital regulator is dynamic in action and control of the Pulse Width Modulated Power Supplies and thus continually seeks to maintain the optimum corona charge. Namely, the instruction to the UP/DOWN counting means of the regulator to count up, maintain, or count down is dynamically following the potential at Node VS.

As explained broadly earlier herein, the digital regulator at all times subsequent to power on maintains a count in its UP/DOWN count means. Between duty cycles, this count will be the count arrived at in the preceding duty cycle.

Figure 6:
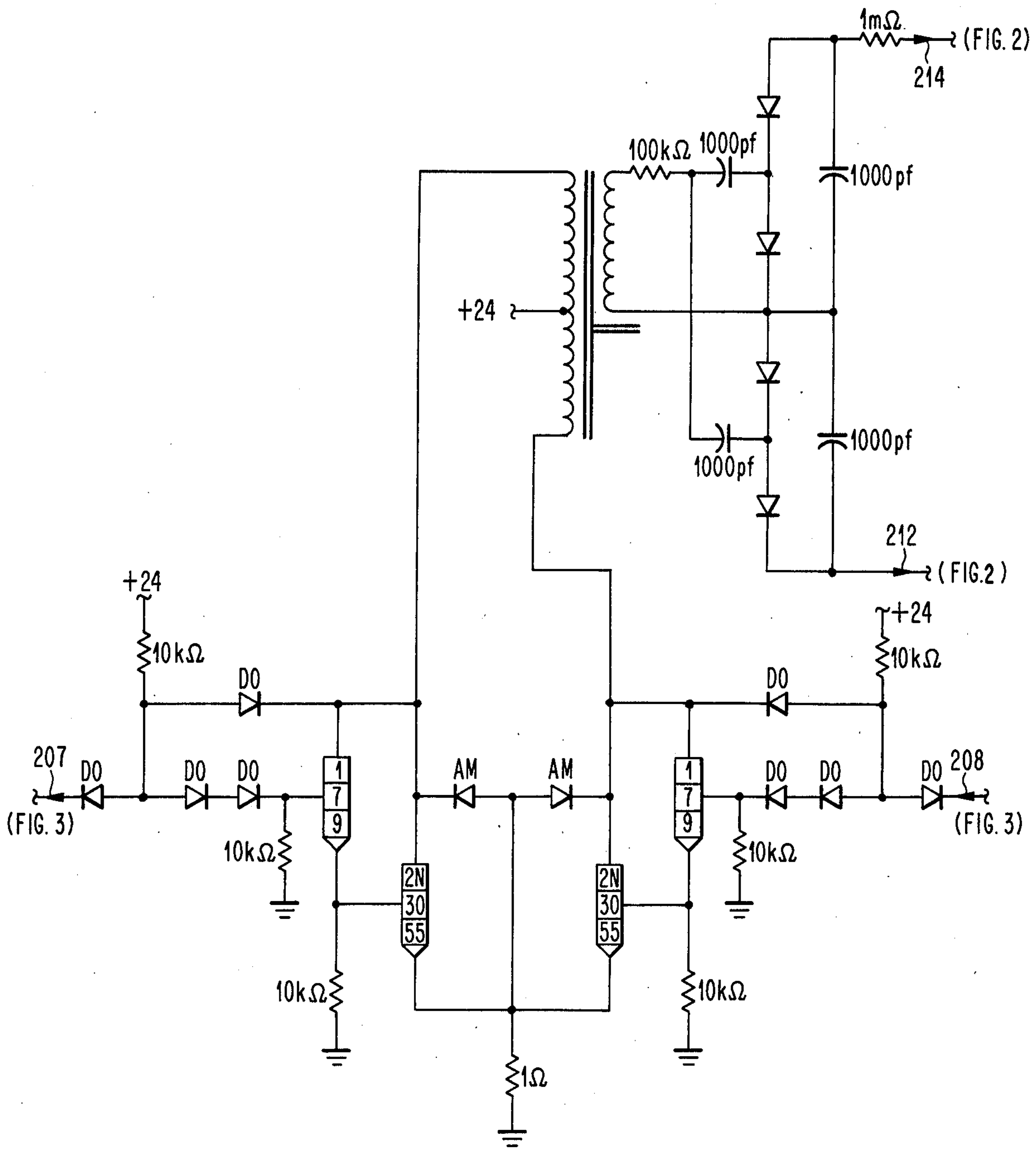
FIG. 6, in accordance with the preferred embodiment of the invention, discloses a circuit schematic of pulse width modulated power supply No. 1 employed in the digitally regulated power supply of FIG. 2.
Figure 7:
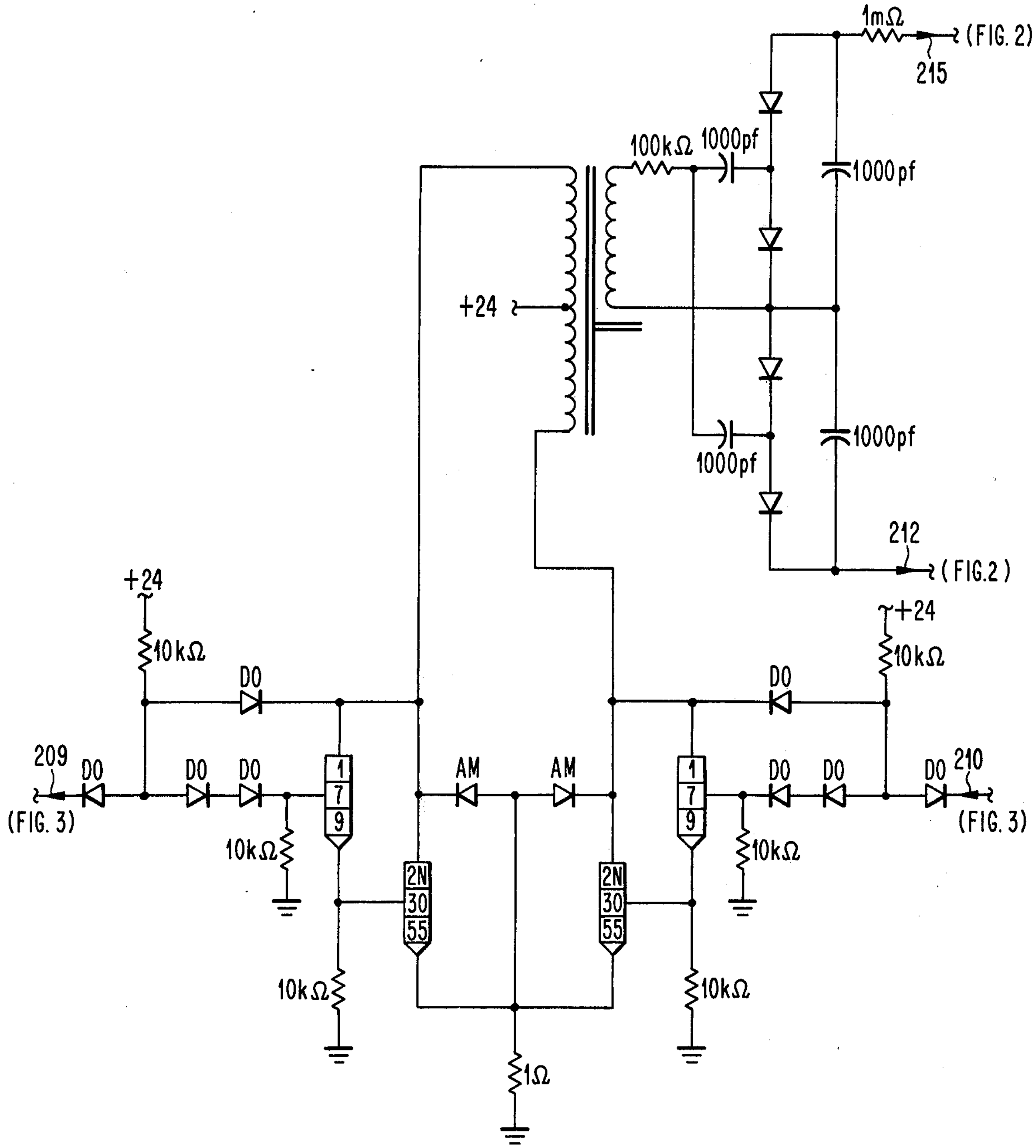
FIG. 7, in accordance with the preferred embodiment of the invention, discloses a circuit schematic of pulse width modulated power supply No. 2 employed in the digitally regulated power supply of FIG. 2.

A block diagram of the Digital Regulator 301 of FIG. 2 is disclosed in FIG. 3. The 5.12 megahertz oscillator 310 in FIG. 3 is connected via lead 217 to the 8-bit counter 311 and via lead 218 to the 8-bit comparator 312. The counter 311 is connected via lead 226 to the comparator 312 and via lead 219 to the T flip-flop 314, the R-S flip-flop 315 and the 5-bit counter 316. The 8-bit counter 311 is also connected to lead 206. The comparator 312 is connected via lead 228 to the R-S flip-flop and via lead 227 to the 8-bit UP/DOWN counter 313. The 8-bit UP/DOWN counter 313 is also connected to leads 202, 203 (FIGS. 2 and 4), 206 (FIG. 2), via lead 222 to the 5-bit counter 316, and via lead 223 to OR circuit 317. The 5-bit counter is also connected to lead 206 (FIG. 2). T flip-flop 314 is connected via lead 220 to an input of two input NAND circuit 318 and via lead 229 to an input of two input NAND circuit 319. R-S flip-flop is connected via lead 221 to the second input of NAND circuits 318 and 319. The output of NAND circuit 318 is connected via lead 225 to one input of two input NOR circuit 321 and one input of two input NOR circuit 323. The output of NAND circuit 319 is connected via lead 224 to one input of two input NOR circuit 320 and one input of two input NOR circuit 322. Inhibit No. 1, lead 204 (FIG. 2) is connected to one input of two input OR circuit 317 and the second inputs of NOR circuits 320 and 321. Inhibit No. 2, lead 205 (FIG. 2) is connected to the second input of OR circuit 317 and the second inputs of NOR circuits 322 and 323. The outputs of NOR circuits 320–323 are respectively, connected to leads 207–210 (FIGS. 2, 6 and 7).

Figure 4:
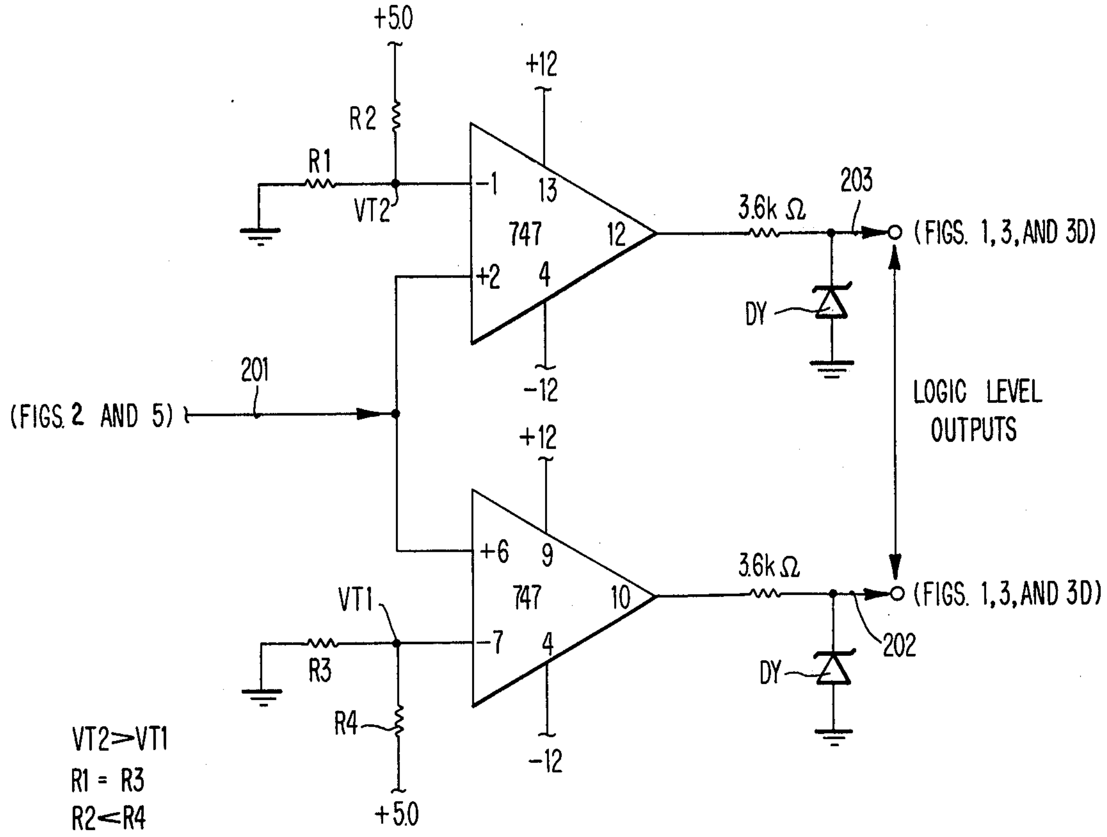
FIG. 4, in accordance with the preferred embodiment of the invention, discloses a circuit schematic of circuitry interconnecting first and second commercially available operational amplifier blocks to provide the threshold detector employed in the digitally regulated power supply of FIG. 2.

The circuitry of the threshold detector, represented in FIG. 2 by block 303 may be of the type shown in FIG. 4. As seen from FIG. 4, the threshold detector circuit employs first and second commercially available operational amplifiers, Type No. 747. Operational amplifiers of this type are available from numerous commercial sources such as the Texas Instrument Corporation. (Numerous Threshold Detector circuits are known to the art. It is submitted to be well within the skill of the art to provide a suitable threshold detector circuit for the practice of applicants' invention). The Threshold detector circuit of FIG. 4, per se, is not deemed to require or warrant a detailed explanation in view of the state of the art and the circuit detail set forth in the drawing.

Figure 5:
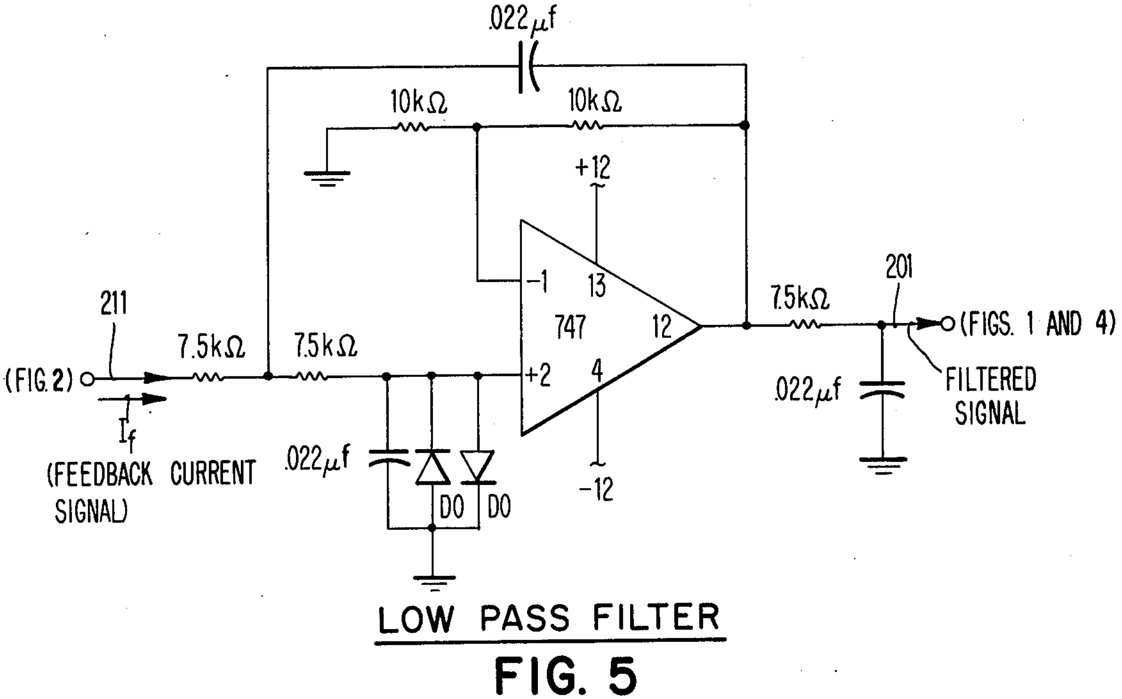
FIG. 5, in accordance with the preferred embodiment of the invention, discloses a circuit schematic of circuitry interconnecting a commercially available operational amplifier to provide the low pass filter employed in the digitally regulated power supply of FIG. 2.

Referring to FIG. 4, lead 201 from the Low Pass Filter, FIG. 5, provides a signal to the Threshold detector which electrically manifests the magnitude of the photoconductor voltage. The threshold detector is response to the electrical manifestation on lead 201 provides one of three combinations of high/low electrical (voltage) manifestations on leads 202 and 203. The following chart correlates the electrical status of lead 201, the photoconductor voltage indicated thereby, and the resulting electrical status of leads 202 and 203, respectively.

| Potential On line 201 | Potential On line 202 | Potential On line 203 | Magnitude of Photoconductor Voltage |
|---|---|---|---|
| within range | high | low | correct |
| low | low | low | low |
| high | high | high | high |

The circuitry of the Low Pass Filter, represented in FIG. 2 by block 302 may be of the type shown in FIG. 5. The Low Pass Filter includes a commercially available operational amplifier, Type 747. (Numerous Low Pass Filter circuits are known to the art. It is submitted to be well within the skill of the art to provide a suitable low pass filter circuit for the practice of applicants' invention). The operation and function of the low pass filter of FIG. 5, per se, is not deemed to require or warrant a detailed explanation in view of the state of the art and the circuit detail set forth in the drawing.

Lead 211 of the low pass filter of FIG. 5 is connected to Node VS, FIG. 2. The pulsating electrical potential at node VS is integrated, amplified and appears on lead 201 as a "high", "in range", or "low" analog potential. As stated and described, supra, the potential on lead 201 is impressed on the input to the threshold detector 303.

The circuitry of the Pulse Width Modulated Power Supply No. 1, represented in FIG. 2 by block 304, may be of the type shown in FIG. 6. The circuitry of the Pulse Width Modulated Power Supply No. 2, represented in FIG. 2 by block 305, may be of the type shown in FIG. 7. It will be seen that the circuits of the pulse width modulated power supplies are identical. Although this is a preferred and desired condition is applicants preferred embodiment of their invention, as disclosed, it will be appreciated that the practice of applicants' invention does not necessarily require that the power supply circuits be identical. (Numerous pulse width modulated power supplies are known to the art. It is submitted to be well within the skill of the art to provide suitable pulse width modulated power supply circuits for the practice of applicant' invention). Power supply No. 1, FIG. 6, is connected via leads 207 and 208 to the Digital Regulator 301 (FIGS. 2 and 3) and via lead 214 to the corona wire of bay 2 of corona generating device 306, FIG. 2. Power supply No. 2, FIG. 2, is connected via leads 209 and 210 to the digital regulator 301, and via lead 215 to the corona wire of bay 1 of corona generating device 306. Leads 212 of the power supplies, FIGS. 6 and 7, are connected in common and via resistor R2 (FIG. 2) to Node VS. The operation of the power supplies and the control thereof by the digital regulator will be fully apparent from the further detailed description of the preferred embodiment of applicant' invention set forth hereinafter.

The circuitry of the 5.12 Megahertz oscillator, represented in FIG. 3 by block 310, may be of the type shown in FIG. 3A. As seen from FIG. 3A, the circuitry of the oscillator employs a commercially available component, Type No. SN 74123, Texas Instrument Corporation. The oscillator circuit of FIG. 3A is connected via lead 217 to the 8 bit counter 311 (FIG. 3 and 3B) and via lead 218 to the 8 bit comparator (FIGS. 3 and 3C). The circuitry and operation of oscillators of the type depicted in FIG. 3A are well known to persons skilled in the art.

The circuitry of the 8 bit counter, represented in FIG. 3 by block 311, may be of the type shown in FIG. 3B. As seen from FIG. 3B, the circuitry of the 8-bit counter may employ two interconnected commercially available components, Type No. SN 74193, Texas Instrument Corporation. The input of the counter is connected via lead 217 to the output of the oscillator (FIG. 3A). The output of the counter is conveyed via lead 219 to the input of the T flip-flop (FIG. 3E), the set input of the R-S flip-flop (FIG. 3F) and the input of the 5-bit counter (FIG. 3E). The 8-bit counter has a radix of $2^8$ (256) and hence provides an output pulse on lead 219 every 256th input pulse received from the oscillator.

The circuitry of the 8-bit comparator, represented in FIG. 3 by block 312, may be of the type shown in FIG. 3C. As seen from FIG. 3C, the circuitry of the comparator may comprise two interconnected commercially available components, Type No. SN 7485, Texas Instruments Corporation. It will be apparent that the 8-bit comparator provides an output on lead 228 to the R-S flip-flop upon equality of the count in 8-bit counter 311 (lead 226) and the count in 8-bit UP/DOWN counter 312 (lead 227). From FIG. 3C it will be seen that the output of the oscillator circuit 310, gates the output of the comparator through an AND circuit 340 and via lead 228 to the reset input of the R-S flip-flop.

Figure 3D:
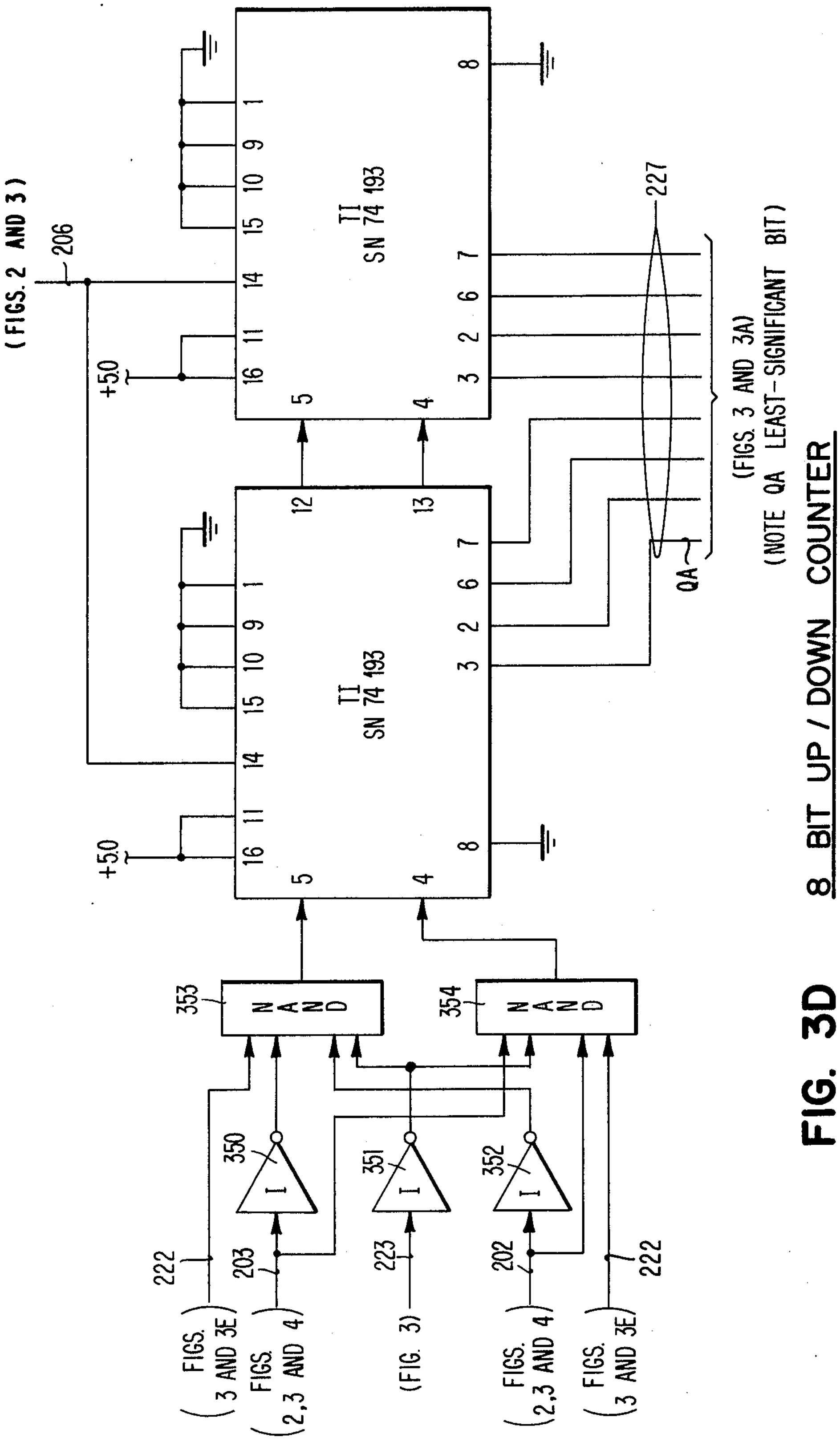
FIG. 3D in accordance with the preferred embodiment of the invention, discloses a circuit schematic of circuitry interconnecting first and second blocks, respectively representing like commercially available components, to provide the 8-bit UP/DOWN counter employed in the digital regulator of FIG. 3.
Figure 3E:
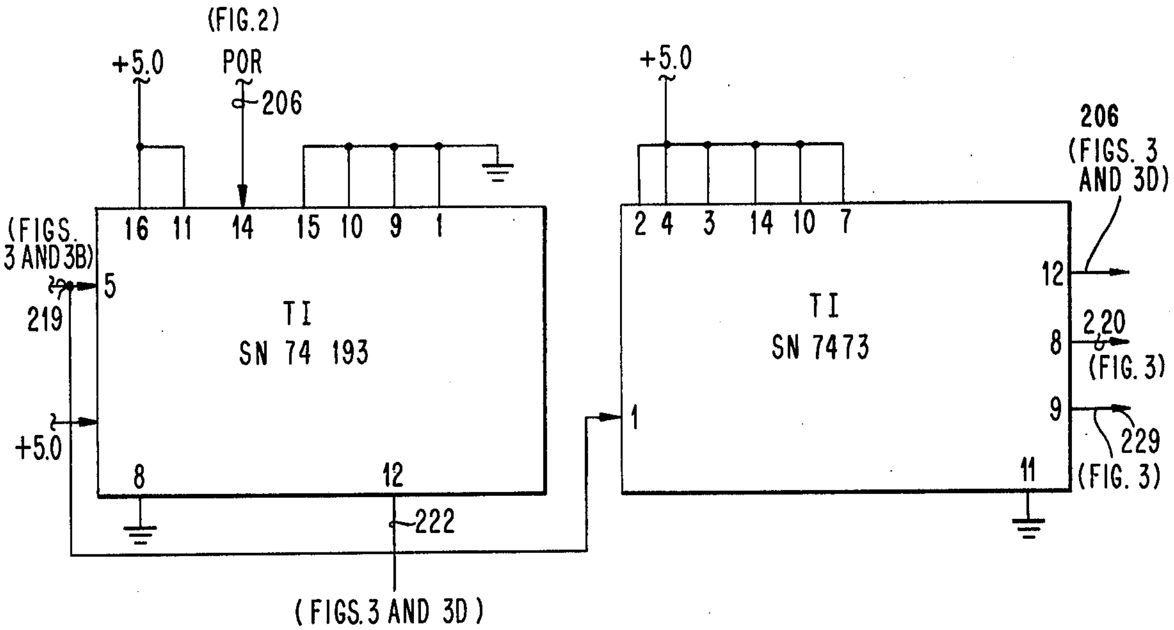
FIG. 3E, in accordance with the preferred embodiment of the invention, discloses a circuit schematic of circuitry interconnecting first and second blocks, representing commercially available components, to provide the five bit counter and the T flip-flop employed in the digital regulator of FIG. 3.

The circuitry of the 8 bit UP/DOWN counter, represented in FIG. 3 by block 313 may be of the type shown in FIG. 3D. As seen from FIG. 3D, the circuitry the UP/DOWN counter may include two interconnected commercially available components, Type No. SN 74193, Texas Instruments Corporation, together with logical circuitry (inverters, NANDS) for directing the counter to, not count, count UP, or count DOWN in response to pulses on line 222 from the five bit counter 316. The four input NAND circuits 353, 354 may be commercially available components, Type No. SN 7420, Texas Instruments Corporation. The inverter circuits 350–352 may be commercially available components, Type No. SN 7404, Texas Instruments Corporation. Lead 222 from the five bit counter is connected to an input of NAND circuit 353 and an input of NAND circuit 354. Lead 203 is connected to the input of inverter circuit 350 and an input of NAND circuit 354. The output of inverter circuit 350 is connected to an input of NAND circuit 353. Lead 223 is connected to the input of inverter circuit 351 whose output is connected to an input of NAND 353 and an input of NAND 354. Lead 202 is connected to the input of inverter 352 and an input of NAND 354. The output of inverter 352 is impressed on an input of NAND 353.

The 8-bit UP/DOWN counter 313 will count UP (in response to pulses on line 222 via NAND 353) when (1) lead 203 is DOWN, (2) lead 223 is DOWN and, (3) lead 202 is DOWN.

The 8-bit UP/DOWN counter 313 will count DOWN (in response to pulses on line 222 via NAND 354) when (1) lead 203 is UP, (2) lead 223 is DOWN, and (3) lead 202 is UP. When lead 202 is UP and lead 203 is DOWN the UP/DOWN counter will not respond (count UP or DOWN) to pulses on lead 222. Under this condition, neither counting UP nor DOWN, the 8-bit UP/DOWN counter will merely maintain its current count, awaiting instruction to count UP or DOWN. As recited above, the instruction to count UP, DOWN, or maintain count is electrically manifested on leads 202, 203 and 223 and may be summarized as follows:

| Counter 313 | Lead 223 | Lead 202 | Lead 203 |
|---|---|---|---|
| Maintain Count | UP | — | — |
| Maintain Count | DOWN | UP | DOWN |
| Count UP | DOWN | DOWN | DOWN |
| Count DOWN | DOWN | UP | UP |

It will be noted that the UP/DOWN counter is connected to lead 206 (FIG. 2) and conveys the count stored therein to the 8-bit comparator 312 via lead 227.

The circuitry of the 5-bit counter and T flip-flop, respectively, represented in FIG. 3 by blocks 316 and 314, may be of the type shown in FIG. 3E.

As seen from FIG. 3E, the 5-bit counter and T flip-flop circuitry may be provided by interconnecting two commercially available components, Type Nos. SN 74193 and SN 7473, Texas Instruments Corporation.

Referring to FIGS. 3 and 3E, the output of the 8-bit counter 311, via lead 219, is impressed on the input of the 5-bit counter and the T flip-flop. The output of the 5-bit counter is impressed, via lead 222, on the input of the 8-bit UP/DOWN counter. The outputs of the T flip-flop are impressed, via lead 220 on an input of NAND 318, and via lead 229 on an input of NAND 319. From FIGS. 3 and 3E it will be seen that the POR and $\overline{\text{POR}}$ signals from machine logic (FIG. 2) are received by the 5-bit counter and T flip-flop.

Figure 3F:
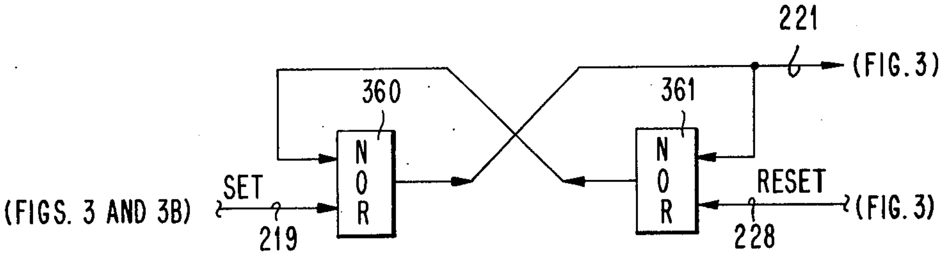
FIG. 3F, in accordance with the preferred embodiment of the invention, discloses a circuit schematic of circuitry interconnecting first and second commercially available NOR logic blocks to provide the R-S flip-flop employed in the digital regulator of FIG. 3.

Referring to FIG. 3F, the circuitry of the R-S flip-flop, represented in FIG. 3 by block 315 is shown. The R-S flip-flop as depicted in FIG. 3F comprises the interconnection of a first two input NOR circuit 360 and a second two input NOR circuit 361. Via lead 219, the output of the 8-bit counter 311 is impressed on an input of NOR 360 (set input of R-S flip-flop). Via lead 228 the output of the 8-bit comparator 312 is impressed on an input of NOR 361. (Reset input of R-S flip-flop). The output of NOR 361 is impressed on the other input of NOR 360. The output of NOR 360 is impressed on the other input of NOR 361 and on line 221 (the output of the R-S flip-flop). Nor circuits 360 and 361 may respectively be commercially available components, Type Nos. SN 7402.

Summary Discussion of Preferred Embodiment of Invention and Components Thereof Corona Generating Device 306, FIG. 2:

The corona charging unit may have any number of bays or generating wires. The unit may be powered by one or multiple power supplies. With multiple bays and multiple power supplies, however, the charging of the medium (photoconductor) is accomplished in a smaller area as it passes beneath the corona unit. This is because the individual bays and supplies can be turned on sequentially. The practice of applicants' invention is not limited to a particular structural type of corona charging unit. A number of corona charging units known in the art may be employed in the practice of applicants' invention.

UP/DOWN Counter 313, FIG. 3:

This counter responds to signals from the threshold detector 303, FIG. 2. In the feedback signal is low, counter counts up. If signal is high, counter counts down. If signal is between given threshold voltages, counter locks into a given state.

Five bit counter 316, FIG. 3:

This counter may be essentially the same type of hardware as the eight bit counter 311. It is logically told to count up. Its input is the output of the main eight bit counter. Once the eight bit counter has cycled, it pulses the five bit counter. For stability reasons, the up/down counter 313 should change slowly with respect to the eight bit counter 311. The five bit counter has $2^5$ logical states. Thus, after 32 pulses from the eight bit counter, the up/down counter has cycled once. In other words, the five bit counter provides the necessary delay for the feedback system.

Comparator 312, FIG. 3:

This unit compares the states of the two counters 311 and 313. Whenever the two have the same logical state, the comparator sends out a pulse to R-S flip-flop 315.

Example: Assume counter 311 is in state 11010001 and up/down counter 313 is in state 11011110. The comparator sends out no signal. As clock 310 continues running, counter 311 cycles until it has state 11011110 at which time the comparator puts out a pulse.

Its purpose is as follows: Counter 311 sets R-S flip-flop each time it runs through a cycle. Microseconds later, as counter 311 cycles, the comparator sees that counter 311 and up/down dounter 313 have arrived at the same state, at which time it resets R-S flip-flop 315. Thus, as the up/down counter moves up in state, the time between the set and reset pulses increases, whereas the time between set and reset pulses will decrease when the up/down counter moves down in state.

T (Toggle) Flip-Flop 314, FIG. 3:

When transformer are used in the pulse width modulated power supplies (FIGS. 6 and 7) polarity reversing is necessary. In the illustrative embodiment, one-half the primary is driven for a certain time period to establish a magnetic flux in the transformer core. Then the other half of the primary is driven to establish a flux opposite to the initial flux for symmetrical transformer operation. The toggle flip-flop has a Q and $\overline{Q}$ output (leads 220, 229, FIG. 3). During one half cycle of operation, one side of the transformer is pulsed. This would correspond to Q in one state and $\overline{Q}$ in another. The next half cycle, Q and $\overline{Q}$ reverse states and the other half of the transformer is pulsed. The two outputs (220, 229) of the flip-flop 314 toggle when the input is pulsed by pulses from counter 311.

R-S Flip-Flop 315, FIG. 3:

This flip-flop is set (output goes high) by a pulse from the 8-bit counter 311 going through a complete cycle. Its output goes low (it is reset) upon receipt of a pulse from the comparator 312. The time duration of the output pulse of the R-S flip-flop, between set and reset, is the modulated pulse which directs and controls the drivers of the power supplies as to how long to apply power. Specifically, the time duration of this pulse from the R-S flip-flop controls the duty cycle of power supplies Nos. 1 and 2, FIGS. 2, 6 and 7. As the up/down counter 313 changes state with respect to the 8-bit main counter 311, the R-S flip-flop pulses change in width (time duration) and thus, either increase or decrease the power, or energy provided to the transformers of the power supplies.

Five bit counter 316, FIG. 3:

This counter receives a pulse after each complete cycle of the 8-bit counter 311. In other words, the 8-bit counter goes through $2^8$ (256) states before it pulses the five bit counter. So, a 20 KHZ pulses comes to the counter which divides the frequency by $2^5$ (32). Thus, a 625 HZ signal leaves counter 316 to go to the up/down counter 313. This delay is put in so that the up/down counter will not change states so rapidly that the system may become unstable. It will be appreciated that applicants' invention is not limited to the specific radix of each of the counters 311, 313 and 316.

In high speed applications, it is necessary to turn the coronas "on" or "off" during small intervals (areas) of the medium to be charged. As the drum revolves, or the medium moves, beneath the corona, the particular area to be charged approaches the corona. As this area goes beneath the corona, it is necessary to charge it as fast as possible. In prior art regulated power supplies, the outputs may take 40–50 miilliseconds, or more, to turn on. In applicants' digitally regulated power supply the up/down counter is already set for the correct output pulse width. So the power supply turns on with a predetermined pulse and does not have to go through a regulating mode every time. It will reach its full potential in much less time than the prior art regulated power supplies.

Admittedly, as explained earlier herein, during initial turn on, the supply, in accordance with the invention, goes through an initial, or "warm up" regulating mode. Once the threshold detector 303 sees that the feedback current is in the correct operating region, it tells the up/down counter 313 to remain in its present state. This state (or pulse width information) is stored in the counter so that when the supply is turned "off" then "on" again, the pulse width information is still there and the supply does not have to go through the regulating process. Namely, subsequent to "warm-up", regulation is dynamically maintained, as explained earlier herein starting from the initial count in the UP/DOWN counter.

Figure 8:
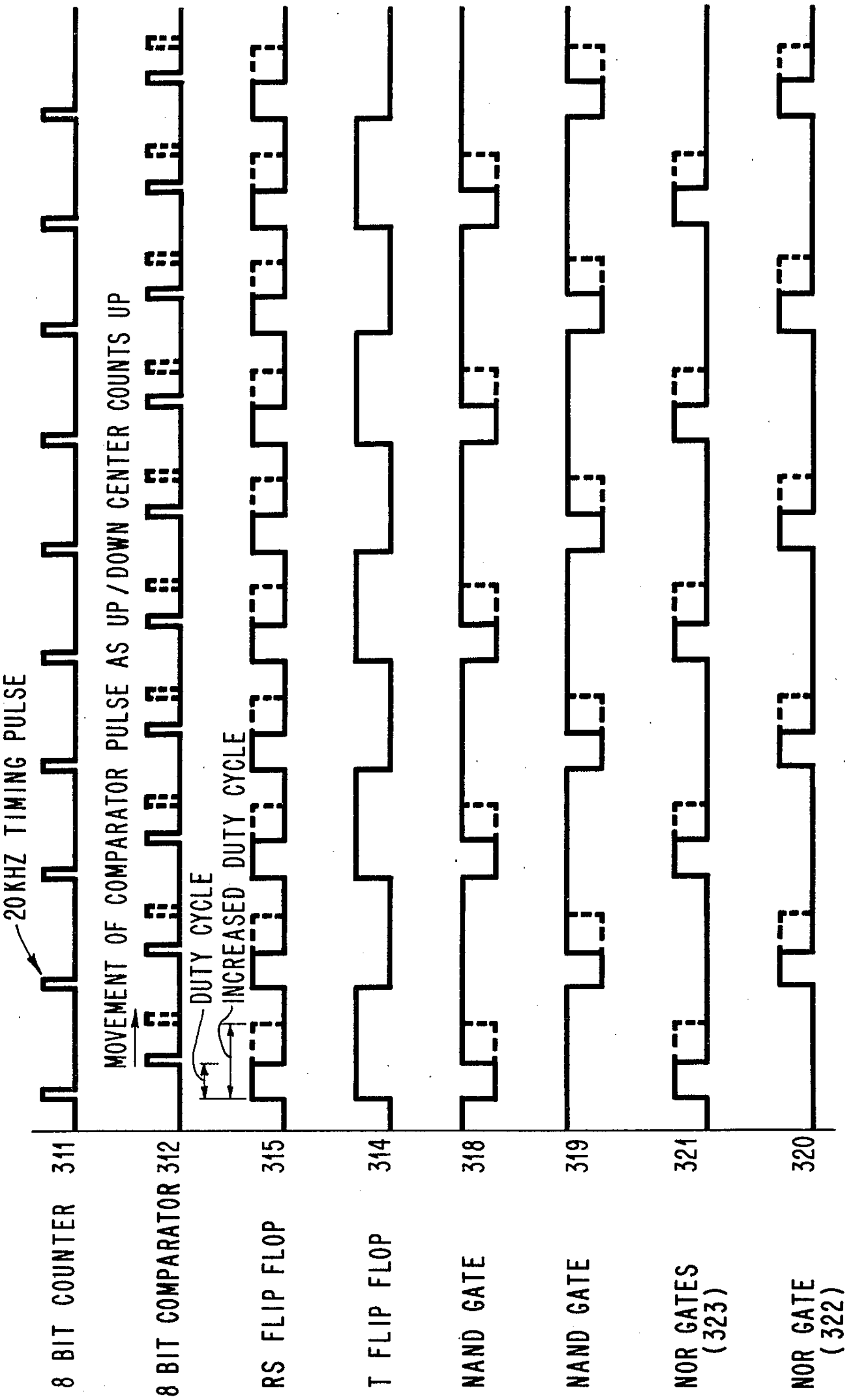
FIG. 8 discloses idealized waveforms referred to hereinafter in the detailed explanation of the operation the digitally regulated power supply in accordance with the preferred embodiment of the invention.

Referring to FIGS. 2, 3 and 8:

A 5.12 MHZ clock 310 drives a counter 311 which is constantly cycling through its states. A 20 KHZ pulse comes from counter 311 when it completes a cycle. This pulse toggles the T flip-flop 314 and sets the R-S flip-flop 315. Also it drives a delay counter 316 (÷ by 32), which lets the up/down counter 313 know when it can change states. At every pulse from the five bit counter 316, the up/down counter 313 will either remain steady, count up, or count down. The time relationship between the states of the 8-bit counter 311 and the up/down counter 313 is an important feature for an understanding of the operation of the pulse width modulated power supply in accordance with the invention. Assume that the threshold detector 303 has determined that the feedback current is in its correct operating region. It will hold the count on the up/down counter 313. The 8-bit counter 311, which is cycling, will set the R-S flip-flop 315 at a certain point in time. As this counter cycles, it will come to the point where its state is the same as the up/down counter's state (which is not now conting). At this time, the line 228 will reset the flip-flop. A fixed pulse width is stored in the digital regulator 301, as long as the up/down counter is steady (not counting). Now assume the threshold detector determined that more output power is needed and directs the up/down counter to count up. With this change of conditions, the time period between the set and reset pulses conveyed to R-S flip-flop 315 has increased. Thus, the output pulse from the flip-flop is longer.

Machine logic 300 tells the power supply to turn on. The digital regulator pulses the modulated power supplies. The modulated power supplies amplify the pulses, which drive transformers which turn the pulses into AC waveshapes. The AC waveshapes are rectified to DC levels. These DC voltages cause the corona wires to emit current. The feedback current is filtered and goes to the threshold detector. When the threshold detector senses the correct feedback, it tells the regulator to stop increasing the drive pulse widths. (The up/-down counter is no longer able to change state and this, the R-S flip-flop pulse is held constant).

It will be readily apparent to persons skilled in the art that the practice of applicant's invention is not limited to the specific structure of the preferred embodiment. Numerous changes and modifications may be made without departing from the scope and spirit of the invention. Merely by way of example, applicants' invention is not to be considered limited by the radix of the counters, the standard commercially available components employed, the particular frequencies recited, or the specific circuitry and interconnection depicted in the drawing and recited in the specification.

While the invention has been particularly shown and described with reference to a preferred embodiment thereof, it should be understood by those skilled in the art that the foregoing and other changes in form and detail may be made therein without departing from the spirit and scope of the invention.

What is claimed is:

1. In an electrophotographic machine of the type described, a method for rapidly supplying a predetermined voltage from a power supply to a charge corona unit, said method comprising the following steps:

(a) preconditioning a digital regulator of the power supply to the nominal operating point for the corona voltage supplied to the charge corona unit;

(b) digitally controlling the power supply with the preconditioned regulator upon initial electrical connection of the power supply to the corona unit; and (c) digitally dynamically regulating the power supply in accordance with variations of the corona provided by the charge corona unit after the power supply is electrically connected to the corona unit.

2. In an electrophotographic machine of the type described, a method for rapidly supplying a predetermined voltage from a power supply to a charge corona unit having at least first and second bays, said method comprising the following steps:

(a) preconditioning a digital regulator of the power supply to provide a predetermined amount of electrical energy to said charge corona unit;

(b) utilizing said digital regulator, as preconditioned, to regulate the power supply to provide said predetermined amount of electrical energy to said charge corona unit when less than all of said at least first and second bays of said charge corona unit are electrically connected to said power supply; and (c) utilizing said digital regulator to dynamically digitally regulate the amount of electrical energy provided to said charge corona unit, when all bays of said unit are electrically connected to the power supply.

3. In an electrophotographic machine a power supply system for charging a corona generating unit to provide an electrostatic charge on a photoconductor medium, said power supply system including:

a corona generating unit adjacently positioned to a photoconductor medium to be electrically charged;

a controllable power supply means coupled to said corona generating unit and said photoconductor medium for impressing a direct current potential on said corona generating unit with respect to said photoconductor medium;

feedback circuit means coupled to said power supply means and said corona generating unit, said feedback circuit means dynamically providing a binary digital electrical manifestation indicative of whether the power supplied to the corona generating unit is below proper level, at proper level, or above proper level;

digital regulator means coupled to said feedback circuit means and said controllable power supply, said digital regulator means being responsive to said feedback circuit means and controlling said power supply means, to increase the power supplied to said corona generating unit when said feedback circuit means manifests that the power supplied to said corona generating unit is below the proper level, to maintain constant the power supplied to said corona generating unit when said feedback circuit means manifests that the power supplied to said corona generating unit is at the proper level, and to decrease the power supplied to said corona generating unit when said feedback circuit means manifests that the power supplied to said corona generating unit is above the proper level;

and said digital regulator means being characterized by the inclusion of a single UP/DOWN counting means responsive to said electrical manifestation from said feedback circuit means, a source of periodic pulses, first counting means connected to said source of periodic pulses, second counting means coupling said first counting means to said UP/-DOWN counting means, comparator means for comparing the count of said first counting means with the count of said UP/DOWN counting means and logical circuit means including bistable circuit means, said logical circuit means interconnecting said first counting means and said comparator means with said controllable power supply means.

4. In an electrophotographic machine, a power supply system as recited in claim 3 further characterized in that said corona generating unit includes a grid and said feedback circuit means comprises a serial circuit including, in the order recited, said grid of said corona generating unit, a low pass filter circuit and a threshold detector circuit.

5. In an electrophotographic machine wherein an electrical charge is selectively impressed on a moving photoconductor medium by controllably generating a corona discharge between a corona generating device and said moving photoconductor medium, a charge corona power supply means said charge corona power supply means comprising:

a moving photoconductor medium;

a corona generating device having a first bay and a second bay encompassed by a shield, said first and second bays each including at least one corona generating wire, said corona generating device being positioned adjacent said photoconductor medium and having a grid positioned between said corona generating wires and said photoconductor medium;

a controllable first pulse width modulated power supply for providing a DC potential on said at least one corona wire of said first bay of said corona generating device;

a controllable second pulse width modulated power supply for providing a DC potential on said at least one corona wire of said second bay of said corona generating device;

connection means including resistance means, and a DC potential source, said connection means interconnecting said first and second pulse width modulated power supplies, to said corona wires, said shield, and said grid of said corona generating device, and said photoconductor medium;

said connection means including a node for providing a feedback signal indicative of the electrical charge impressed on said photoconductor medium;

feedback circuit means consisting essentially of a low pass filter and a threshold detector, said feedback circuit means being connected to said node of said connection means, said feedback circuit means accepting said feedback signal indicative of the electrical charge impressed on said photoconductor medium and providing a binary signal having first, second and third discrete states respectively manifesting that the electrical charge placed on said photoconductor is below a desired level, at a desired level, or above a desired level;

digital regulator means including a single UP/-DOWN counter, said digital regulator means being coupled to said feedback circuit means and said first and second pulse width modulated power supplies, said digital regulator means regulating the duty cycle of said first and second power supplies respectively in accordance with said first, second and third binary signals from said feedback circuit means;

whereby the duty cycle of said first and second power supplies is (1) increased in response to said first binary signal, (2) maintained constant in response to said second binary signal, and (3) decreased in response to said third binary signal.

6. In an electrophotographic machine wherein an electrical charge is selectively impressed on a moving photoconductor medium by controllably generating a corona discharge between a corona generating device and said moving photoconductor medium, a charge corona power supply means said charge corona power supply means comprising:

a moving photoconductor medium;

a corona generating device having a first bay and a second bay encompassed by a shield, said first and second bays each including at least one corona generating wire, said corona generating device being positioned adjacent said photoconductor medium and having a grid positioned between said corona generating wires and said photoconductor medium;

a controllable first pulse width modulated power supply for providing a DC potential on said at least one corona wire of said first bay of said corona generating device;

a controllable second pulse width modulated power supply for providing a DC potential on said at least one corona wire of said second bay of said corona generating device;

connection means including resistance means, and a DC potential source, said connection means interconnecting said first and second pulse width modulated power supplies, to said corona wires, said shield, and said grid of said corona generating device, and said photoconductor medium;

said connection means including a node for providing a feedback signal indicative of the electrical charge impressed on said photoconductor medium;

feedback circuit means connected to said node of said connection means, said feedback circuit means accepting said feedback signal indicative of the electrical charge impressed on said photoconductor medium and providing a binary signal having first, second and third discrete states respectively manifesting that the electrical charge placed on said photoconductor is below a desired level, at a desired level, or above a desired level;

digital regulator means coupled to said feedback circuit means and said first and second pulse width modulated power supplies, said digital regulator means regulating the duty cycle of said first and second power supplies respectively in accordance with said first, second and third binary signals from said feedback circuit means;

wherein said digital regulator means is characterized by the inclusion of, a binary counter having a radix of $2^n$ where n is an integer greater than 2 said binary counter having an input and an output, a source of periodic pulses connected to said input of said binary counter, an UP/DOWN binary counter having a radix of $2^n$, said UP/DOWN binary counter having an input and control means for directing said UP/DOWN counter to count UP, maintain its count constant, or count DOWN, said control means of said UP/-DOWN binary counter being connected to said feedback circuit means and responsive to said first, second and third discrete binary states of said binary signal provided by said feedback circuit means, delay circuit means having an input connected to said output of said binary counter and an output connected to said input of said UP/DOWN counter, a binary comparator coupled to said binary counter and said UP/DOWN binary counter, said comparator having an output and providing a signal thereon when said count in said binary counter equals said count in said UP/DOWN counter, a toggle flip-flop having an input, a first output and a second output, said input of said toggle flip-flop being connected to said output of said binary counter, said first and second outputs of said toggle flip-flop providing complementary outputs, a set-reset flip-flop having a set input, a reset input and an output, said set input of said set-reset flip-flop being connected to said output of said binary counter, said reset input being connected to said output of said binary comparator, and logical circuitry coupling said first and second outputs of said toggle flip-flop and said output of said R-S flip-flop to said first and second pulse width modulated power supplies;

whereby the duty cycle of said first and second power supplies is (1) increased in response to said first binary signal, (2) maintained constant in response to said second binary signal, and (3) decreased in response to said third binary signal.

7. In electrostatic transfer reproduction apparatus utilizing a digitally regulated power supply for charging a corona charging unit, a method of rapidly and efficiently arriving at the optimum corona level for properly electrically charging the transfer medium, said method comprising the following steps:

(a) placing a specific control number from a range of control numbers in a digital regulator to regulate a corona power supply to provide a predetermined amount of energy to said corona charging unit;

(b) continuously sensing the electrical characteristics of the corona provided by said corona charging unit to determine whether said predetermined amount of energy is (1) too low in amount, (2) proper in amount, or (3) too high in amount;

(c) continuously appropriately modifying said control number, up or down incrementally, as the case may be, only if the amount of energy supplied to said corona charging unit was determined in step (b) to be too low or two high;

said method being characterized in that upon completion of step (a), steps (b) and (c) are not undertaken until all bays of a multi-bay corona charging unit have been energized.

8. In electrostatic transfer reproduction apparatus utilizing a digitally regulated power supply for a charging a corona charging unit the method of claim 7, wherein the specific control number utilized in step (a) is the final control number arrived at in step (c) of the immediately prior duty cycle employing the method of claim 7.

9. A method for regulating a power supply means employed in an electronic control system having a digital regulator and at least first and second portions energizable in the order recited, said method comprising the following steps:

(a) upon turn on of said first portion of said control system, preconditioning said digital regulator to provide a nominal operating condition for said power supply means;

(b) utilizing said digital regulator as preconditioned to regulate said power supply means until all of said at least first and second portions of said control system are energized; and (c) upon full energization of said power supply means permitting said digital regulator to dynamically regulate said power supply means.

10. A method for regulating a power supply means as recited in claim 9 wherein subsequent to step (c) said control system is turned off and said digital regulator maintains its then current status to be utilized as the afore recited preconditioning of the digital regulator upon subsequent turn on of the control system.

11. In apparatus utilizing a digitally regulated power supply for providing energy to a load unit, a method of rapidly and efficiently arriving at the optimum energy level proper operation of said apparatus, said method comprising the following steps:

(a) placing a specific control number from a range of control numbers in a digital regulator to regulate a power supply to provide a predetermined amount of energy to said load unit;

(b) continuously sensing the electrical characteristics of said load unit to determine whether said predetermined amount of energy is (1) too low in amount, (2) proper in amount, or (3) too high in amount;

(c) continuously appropriately modifying said control number, up or down incrementally, as the case may be, only if the amount of energy supplied to said load unit was determined in step (b) to be too low or two high;

said method being characterized in that upon completion of step (a), steps (b) and (c) are not undertaken until all portions of the load unit have been energized.

12. In electrostatic transfer reproduction apparatus utilizing a digitally regulated power supply for providing energy to a load unit the method of claim 11, wherein the specific control number utilized in step (a) is the final control number arrived at in step (c) of the immediately prior duty cycle employing the method of claim 11.

13. In a machine, a method for rapidly supplying an optimum energy level from a power supply to a utilization unit, said method comprising the following steps:

(a) preconditioning a digital regulator of the power supply to the nominal operating point for the utilization unit;

(b) digitally controlling the power supply with the preconditioned regulator upon initial electrical connection of the power supply to the utilization unit; and (c) digitally dynamically regulating the power supply in accordance with variations of the utilization unit after the power supply is electrically connected to the utilization unit.

* * * * *